United States Patent Office.

JAMES P. WILSON, OF ELMWOOD, ILLINOIS, ASSIGNOR TO HIMSELF AND V. R. DAFOE, OF SAME PLACE.

Letters Patent No. 82,468, dated September 22, 1868.

IMPROVED COMPOSITION FOR DESTROYING INSECTS ON POTATO-PLANTS.

*The Schedule referred to in these Letters Patent and making part of the same.*

TO ALL WHOM IT MAY CONCERN:

Be it known that I, JAMES P. WILSON, of Elmwood, in the county of Peoria, and State of Illinois, have invented a new and valuable Improvement in Means for Destroying Bugs upon Growing Potato-Plants; and do hereby declare that the following is a full, clear, and exact description of the construction and operation of the same.

The nature of my invention consists in providing a chemical compound, in the form of a powder, to be sown upon the potato-plants, which said powder shall produce death to the insect called the potato-bug.

My chemical powder is formed in the following manner:

I take one part of Paris green, and two parts of mineral paint, of any manufacture, and mix them thoroughly together until they are merged into one common powder.

The object of mixing the paint with the Paris green is to so dilute or unite the latter therewith that no injury shall result to the plants.

I take the powder thus prepared, and sow a small quantity thereof upon the growing potato-vines. The best time for sowing it upon the vines is early in the morning, while there is dew upon the vines.

This powder acts as a deadly poison to potato-bugs, and a very few applications thereof will serve to protect the potato-crop from that pernicious and destructive insect.

What I claim as my invention, and desire to secure by Letters Patent, is—

A powder, prepared of the materials and in the manner specified, to be used for the destruction of potato-bugs.

In testimony that I claim the above, I have hereunto subscribed my name in the presence of two witnesses.

JAMES P. WILSON.

Witnesses:
S. D. HOGUE,
J. C. HOPKINS.